United States Patent [19]

Umeda

[11] 4,060,840

[45] Nov. 29, 1977

[54] RECORDING AND/OR REPRODUCING APPARATUS HAVING ADJUSTABLE TAPE GUIDE MECHANISM

[75] Inventor: Hiroyuki Umeda, Yokohama, Japan

[73] Assignee: Victor Company of Japan, Limited, Yokohama, Japan

[21] Appl. No.: 698,497

[22] Filed: June 22, 1976

[30] Foreign Application Priority Data

June 23, 1975 Japan .............................. 50-84987[U]

[51] Int. Cl.² ...................... G11B 15/60; G11B 15/66
[52] U.S. Cl. ....................................... 360/130; 360/85
[58] Field of Search .................................... 360/85, 130

[56] References Cited

U.S. PATENT DOCUMENTS

| | | | |
|---|---|---|---|
| 3,159,501 | 12/1964 | Maxey | 360/130 |
| 3,319,014 | 5/1967 | Sugawa | 360/130 |
| 3,660,614 | 5/1972 | Swain et al. | 360/85 |
| 3,831,198 | 8/1974 | Kihara et al. | 360/130 |

Primary Examiner—Robert S. Tupper

[57] ABSTRACT

A recording and/or reproducing apparatus has a guide drum including at least one rotating head. A tape guide guides a recording tape helically, relative to the rotating plane of the head, around the cylindrical surface of the guide drum. A mechanism is provided for adjusting the tape guide position. The mechanism comprises a member for supporting the tape guide, and means for causing the supporting member together with the tape guide. The height position and the uniformity of tension in the transverse direction of the tape or in the vicinity of the guide drum are adjusted by displacement of the tape guide.

7 Claims, 12 Drawing Figures

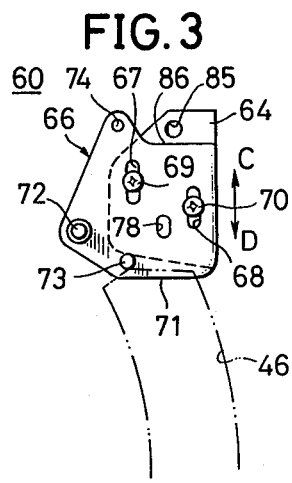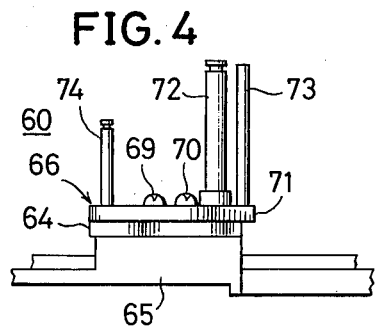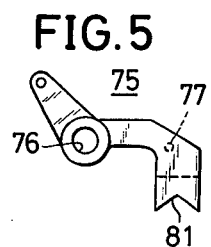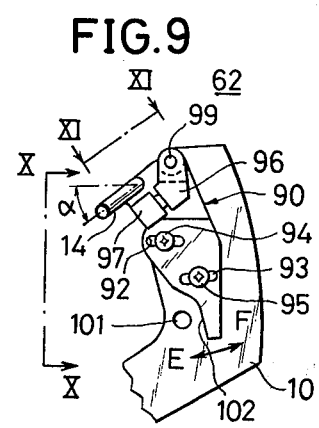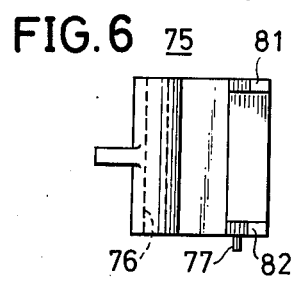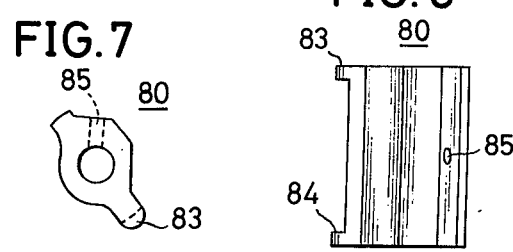

RECORDING AND/OR REPRODUCING APPARATUS HAVING ADJUSTABLE TAPE GUIDE MECHANISM

BACKGROUND OF THE INVENTION

The present invention relates generally to recording and/or reproducing apparatus including a mechanism for adjusting a tape guide. More particularly, the invention relates to a tape guide adjusting mechanism for use in a recording and/or reproducing apparatus of an automatic tape loading type. The tape is automatically drawn from a tape cassette and loaded in a predetermined tape travel path.

In general, there have been helical-scanning recording and/or reproducing apparatus wherein a video signal is recorded and reproduced by one or more rotating video heads. Recording tracks are made on and reproduced from a magnetic tape along a plurality of mutually parallel tracks, disposed obliquely relative to the longitudinal direction of the tape. In a recording/reproducing apparatus of this type, it is necessary for the magnetic tape to travel accurately along a predetermined tape path over the cylindrical surface of a guide drum surrounding one or more rotating video heads, so that the rotating heads form the correct track pattern on the magnetic tape during recording or trace over the correct tracks during reproducing.

The travel path of the tape over the cylindrical guide drum surface is determined by a tape guide mechanism. The mechanism extends from the inlet side of the guide drum cylindrical surface, that is, the supply side, to the outlet side of the guide drum cylindrical surface, that is, the take-up side. Accordingly, it is necessary to adjust the tape guide mechanism in order to cause the tape path to coincide accurately with the desired or predetermined tape path.

In known recording/reproducing apparatus, guide poles having flanges have been used for guiding the edges of the tape. An adjustment of the tape path has been accomplished by adjusting the height positions of these guide poles, relative to the chassis base, and at the points where the tape is guided by the tape guide poles.

However, it is troublesome to adjust the heights of the guide poles. Such an adjustment, requires high skill, and cannot be easily carried out. Furthermore, when the height of a guide pole is adjusted, its flange imparts an excessive force upon the edge of the tape. Then, the tension in the tape becomes non-uniform in its transverse direction. In extreme cases, the tape undergoes a deformation such as bending.

SUMMARY OF THE INVENTION

Accordingly, a general object of the present invention is to provide a novel and useful recording and/or reproducing apparatus having a tape guide adjusting mechanism in which the above described difficulties have been overcome.

Another and more specific object of the invention is to provide a recording/reproducing apparatus having a tape guide mechanism which is adjustable, with a simple control procedure. Moreover, is adjustment is without an occurrence of a non-uniform tension in the transverse direction of the tape. The tape guiding means adjusts the tape path along the cylindrical surface of the guide drum.

Still another object of the invention is to provide a recording/reproducing apparatus having an easily adjustable tape guide mechanism including a plate which undergoes sliding or rotating displacement, within a plane parallel to the chassis base.

Still other objects and further features of the invention will be apparent from the following detailed description when read in conjunction with the accompanying drawings.

BRIEF DESCRIPTION OF THE DRAWINGS

In the drawings:

FIGS. 3 and 4 are respectively a plan view and a left side view of a mechanism for adjusting the rotational position of a loading arm;

FIGS. 5 and 6 are respectively a plan view and a front view of a guide lever;

FIGS. 7 and 8 are respectively a plan view and a right side view of a tape guide;

FIG. 9 is a plan view of a mechanism for adjusting the direction of inclination of a guide pole;

FIGS. 10 and 11 are elevations as viewed from the planes respectively indicated by lines X—X and XI—XI in FIG. 9, looking in the arrow directions; and FIG. 12 is an elevation of one example of a jig used at the time of adjustment of the apparatus of the invention.

DETAILED DESCRIPTION OF THE INVENTION

Figure 1:
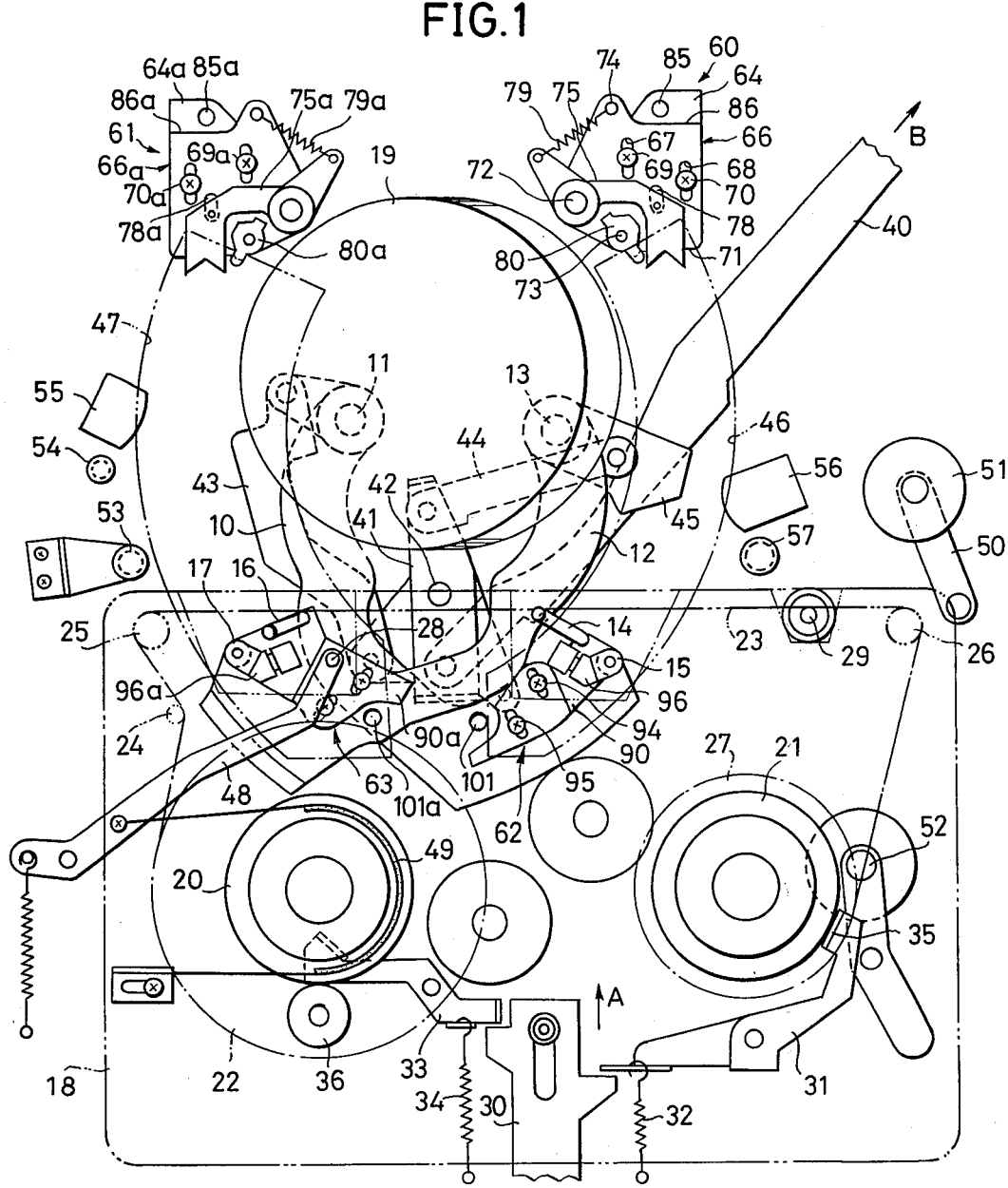
FIGS. 1 and 2 are plan views, with parts cut away, respectively showing the states prior to loading and after completion of loading, of one embodiment of a tape recording and/or reproducing apparatus having a mechanism for adjusting tape guide means according to the present invention.

FIG. 1 shows the apparatus of the invention prior to start of recording. A pair of loading arms 10 and 12 are in their respective positions, as shown. As described more fully hereinafter, the loading arm 10 has an inclined tape guide pole 14 and a guide roller 15. The loading arm 12 has an inclined tape guide pole 16 and a guide roller 17.

A cassette 18 is placed in a loading position in the recording/reproducing apparatus (as indicated by two-dot chain line). The guide poles 14 and 16, the guide rollers 15 and 17, a tension pole on a tension arm 48, and a capstan 29 respectively enter relatively through an opening in the bottom of the cassette 18 and fit into the interior thereof. These members thus fitted are disposed on the inner side, that is, on the side confronting the nonmagnetic surface. A magnetic tape 23 is guided by guide poles 24, 25, and 26 in its span between a tape supply roll 22 and a tape take-up roll 27. The magnetic surface of the tape faces the front of the cassette 18.

When the cassette 18 is placed in its operational position, a supply reel and a take-up reel (neither being shown) on which the tape rolls 22 and 27 are respectively wound within the cassette 18, respectively fit onto a supply side reel disc 20 and a take-up side reel disc 21.

Then, when a PLAY button (not shown) of the recording/reproducing apparatus is pushed, a sliding lever 30 is caused to slide in the arrow direction A. A brake lever 31 is rotated in a clockwise direction, counter to the force of a spring 32. At the same time, a brake release lever 33 is rotated in a counterclockwise direction counter to the force of a spring 34. As a consequence, a braking force is released. This force has been due to a brake shoe 35, acting upon the reel disc 21 and a braking force, due to a braking roller 36, acting upon the reel disc 20.

As another result of the pushing of the PLAY button, a motor (not shown) rotates to actuate a loading drive mechanism (not shown). An actuating lever 40 is caused to slide a specific distance in the arrow direction B. An arm 41 rotates counterclockwise about a shaft 42 into the position shown in FIG. 2. This rotation of the arm 41 is transmitted through a link 43 to rotate the loading arm 10 in a counterclockwise direction, around a shaft 11.

On the other hand, this rotation of the arm 41 is also transmitted through a link 44 and an arm 45 to rotate the loading arm 12 around a shaft 13, in a clockwise direction. As a consequence, the guide poles 14 and 16 respectively with guide rollers 15 and 17 intercept the magnetic tape 23. This tape is drawn out of the cassette 18 through an opening at its front surface. The tape moves along slots 46 and 47 (shown by two-dot chain line) formed in the chassis until the tape reaches a specific position, as indicated in FIG. 2.

Interrelatedly with the movement of the lever 40, the tension arm 48 rotates to its operative position, and a brake band 49 is tensioned. Furthermore, an arm 50 rotates counterclockwise, whereby a pinch roller 51 presses against the capstan 29, with the magnetic tape 23 clamped therebetween. At the same time, a driving roller 52 presses against the take-up reel disc 21.

Figure 2:
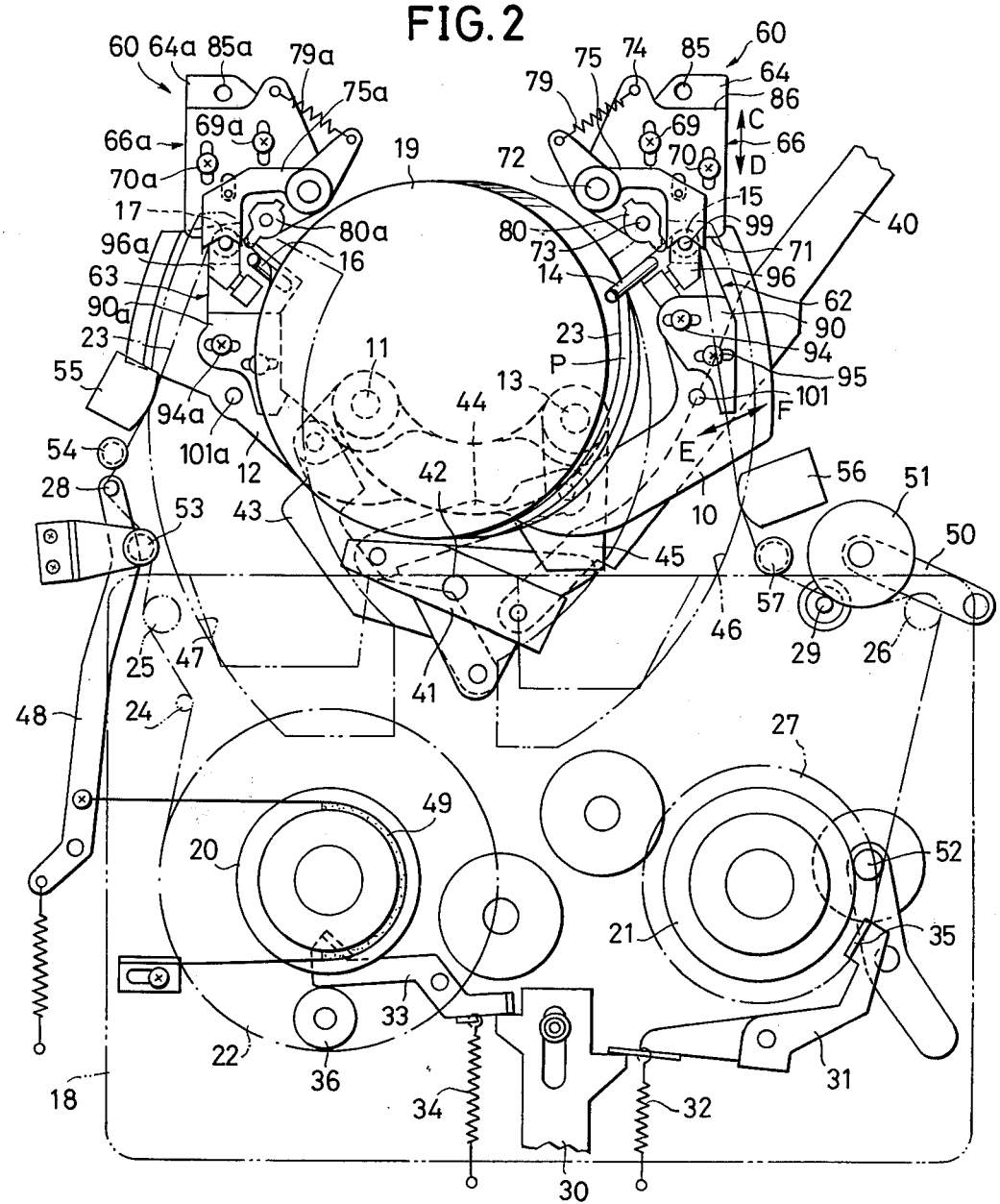

Upon completion of the loading operation, the apparatus is in the state shown in FIG. 2. The magnetic tape 23, drawn from the cassette 18 and from the supply tape roll 22, passes guide poles 53 and 54, between which the tape tension is detected by a tension pole 28. The tape 23 next passes around a full-width erasing head 55 and is then wrapped around a guide drum 19 over a specific angle range determined by the guide poles 16 and 14. Here, rotating video heads (not shown) record a video signal on or reproduce it from the tape 23.

The magnetic tape 23 travels to contact an audio control head 56. After being guided by a guide pole 57, the tape is clamped between and driven by the pinch roller 51 and the capstan 29, to enter the cassette 18. There, the tape is taken up on the take-up tape roll 27. The guide drum 19 is inclined by a specific angle relative to the chassis. The travel path of the magnetic tape 23 wrapped around the cylindrical surface of the guide drum 19 is parallel to the chassis. Moreover, the tape assumes a helical shape with respect to a rotating plane supporting the heads within the guide drum.

This part of the tape guide mechanism causes magnetic tape 23 to pass around the cylindrical surface of the guide drum 19 in wrapping contact therewith. The tape has specific inclination thereto and a specific helical angle, over a specific angular range, and without a nonuniform tension across the width of the tape. The guide poles 14 and 16 must be in respective states defined by specific positions and specific inclinations thereof.

Accordingly, the loading arm rotational position adjusting mechanisms 60 and 61 adjust the ultimate rotational positions of the loading arms 10 and 12. In addition, guide pole inclination direction adjusting mechanism 62 and 63 adjust the directions of inclination of the inclined tape guide poles 14 and 16, which are provided on the loading arms 10 and 12, respectively. These adjusting mechanisms 60, 61, 62, and 63 are adjusted following the assembly of the magnetic recording/reproducing apparatus. This adjustment causes the travel path of the magnetic tape 23, around the surface of the guide drum 19, to coincide accurately with a standard travel path.

Next to be described is the mechanism 60 for adjusting the rotational position of the loading arm 10 at the time of completion of loading (FIGS. 3 and 4). In each of these figures, the mechanism is shown in a state wherein a guide lever 75 and a tape guide 80 are deleted for the sake of clarity in illustration of the mechanism of the adjusting mechanism 60.

A base 64 is fixed to a main base 65 mounted on the chassis and has a reference hole 85. A movable plate 66 is secured onto the base 64 by screws 69 and 70 fitted respectively through slots 67 and 68 formed in this movable plate, and screwed into tapped holes in the bases 64 and 65. By loosening the screws 69 and 70 slightly, this plate 66 can be shifted within a specific range in the arrow directions C and D. The slots 67 and 68 are guided respectively by the screws 69 and 70. The plate 66 has an engagement side face 71 disposed at a height to confront a cutout 100 in a movable block 90 (FIG. 10). Pins 72, 73, and 74 are embedded, at their roots, in the upper surface the plate 66.

The guide lever 75 has a shape as shown in FIGS. 5 and 6 and is pierced with a hole 76, through which the pin 72 is fitted. The lever 75 is supported on the plate 66 to rotate within a range determined by the range of movement of a pin 77 fixed to the lever 75, within a slot 78 formed in the plate 66. The lever 75 is continuously urged to rotate in the clockwise direction by a tension spring 79 stretched between an end of the lever 75 and the pin 74.

The tape guide 80 has a shape as shown in FIGS. 7 and 8 and is fitted onto the pin 73, fixed onto the plate 66, as shown in FIG. 1. The tape guide 80 is fixed to the pin 73 by a screw (not shown), screwed into a tapped hole 85. When as fixed, the guide is at a height position wherein the heights of guide parts 83 and 84 are the same as the heights of upper and lower flanges on the guide pole 57.

The construction of the guide pole inclination direction adjusting mechanism 62, on the loading arm 10, will now be described with reference particularly to FIGS. 9 and 10.

The movable block 90 is rotatably fitted onto a pin 91 fixed on the loading arm 10 at a point near its extreme end. The block 90 is secured to the loading arm 10 by screws 94 and 95 respectively fitted through slots 92 and 93 in the block 90 and screwed into tapped holes in the loading arm 10. By loosening the screws 94 and 95, the block 90 can be rotatably displaced within a specific angular range (in the arrow directions E and F) relative to the pin 91. The slots 92 and 93 are guided respectively by the screws 94 and 95.

The inclined guide pole 14 is fixed, with a specific inclination angle, to a part of the block 90. At the completion of loading, the guide pole 14 is inclined in a direction such that it is at an angle α relative to a reference line parallel to the front face of the cassette 18. Moreover, it is inclined with a specific angle relative to a line perpendicular to the horizontal plane.

A bracket 96 has two opposite flanges and a supporting arcuate part projecting therefrom at the center of the back part thereof. A pin 98 fixed to a projection 97 on the block 90, as shown in FIG. 11, receives and rotatably supports the arcuate part. This bracket 96 is thereby free to rock in a vertical plane and within a specific angular range. The guide roller 15 is rotatably supported by a pin 99 fixed to and between the opposite flanges of the bracket 96.

The rotation of the loading arm 10, in the loading direction (i.e., counterclockwise direction), is limited at the end of this rotation, by the pin 91 within the cutout 100 in the block 90 which strikes and is pressed against the engagement side face 71 of the plate 66. This limited rotation is indicated by a two-dot chain line in FIG. 10. At this time, the upper and lower projection parts of the pin 99 are engaged by a pair of Vee notches of the guide lever 75. The bracket 96 rotates accordingly around the pin 98. As a consequence, the guide roller 15 is placed in a vertical state.

As a result, the tape 23, which has separated from the guide drum 19, is guided by the inclined tape guide pole 14. Thereafter, it is guided at its lateral edges by the upper and lower guide flanges 83 and 84 of the tape guide 80, and then by the guide roller 15.

The procedure for adjusting mechanisms 60 and 62 will now be described. This adjusting procedure is carried out subsequent to the assembling in the manufacturing processes of the recording/reproducing apparatus. A magnetic tape having a previously formed standard or reference track is used with the apparatus in its reproducing mode for video reproducing.

First to be described is the adjustment for varying the tape travel path of the magnetic tape 23 across the cylindrical surface of the guide drum 19. After adjustment this path coincides with the correct tape travel path. This adjustment is accomplished by varying the positions of the tape guide 80 and the guide pole 14, shown in FIG. 2.

In the instant apparatus, the magnetic tape 23 wrappingly contacts the cylindrical surface of the guide drum 19, helically relative to the rotating plane of the rotating heads. Moreover, the guide drum 19 is inclined relative to the chassis base, in a direction which is parallel to the front surface of the cassette. After the magnetic tape 23 has been released from its contact with the cylindrical surface of the guide drum 19, it advances in a direction which approaches the chassis base.

The travel direction this magnetic tape 23 is changed by the inclined tape guide pole 14. At the same time, it is guided that its edges become parallel to the chassis base. Thereafter, the upper and lower edges of the tape are guided by the guides 83 and 84 of the tape guide 80, and are thus adjusted in height position. By varying the positions of the tape guide 80 and the guide pole 14 relative to the guide drum 19, the height of the magnetic tape 23 can be varied at the position P, where it separates from the guide drum 19. In this manner, the travel path can be appropriately varied in the area where the magnetic tape 23 makes it wrapping contact along the cylindrical surface of the guide drum 19.

In this adjustment, a pin 110 (FIG. 12) is used as a jig. This pin 110 has a rod-shaped lower part 111 and an eccentric cylindrical part 112 for making an adjustment which is eccentrically offset from the centerline axis of the pin.

At the time of adjustment, the lower part 111 of the pin 110 is inserted into a reference hole 85 formed at a specific position in the base 64. Then, the screws 69 and 70 are loosened to release the movable plate 66. As a consequence, the plate 66 is pushed by the loading arm 110, which is being urged by a torque to rotate in the counterclockwise direction. The plate 66 is thus moved a small distance in the arrow direction C. Its reference side surface 86 is pressed against the minor-radius side of the eccentric cylindrical 112 on the pin 110.

With the apparatus and its parts in the above described state, the operator making the adjustment, while observing reproduced pictures on the picture screen of a monitor television receiver displaying a signal reproduced from a reference magnetic tape, manipulates the knurled part 113 of the pin 110, and gradually rotates the pin 110 about the axis of its lower part 111, which is inserted into the reference hole 85.

As a consequence of this manipulation, the movable plate 66 is pushed at its reference side surface 86 by the eccentric cylindrical part 112 of the pin 110. Plate 66 gradually moves in the arrow direction D, against the external force imparted thereto by the loading arm 19. This movement of the plate 66 causes a shortening of the distance from the tape guide 80 and the guide pole 14 to the position P on the cylindrical surface of the guide drum 19. Accordingly, the magnetic tape 23 descends somewhat at the position P. As a result, the travel path of the magnetic tape 23 wrappingly contacts the cylindrical surface of the guide drum 19, under the guidance of the pair of guide poles 16 and 14.

The operator making the adjustment gradually varies the travel path of the magnetic tape 23, as it makes its wrapping contact around the guide drum cylindrical surface, while he observes the reproduced picture. When a normally reproduced picture is obtained, the rotating video heads are scanning a loci along the tape which coincides with the track pattern on the tape. There, the operator stops rotating the pin 110. The screws 69 and 70 are then tightened to fix the plate 66 to the bases 64 and 65. Thus, the adjustment is completed, and the travel path of the magnetic tape 23 is adjusted in a desired wrapping contact with the cylindrical surface of the guide drum 19. One set on the correct travel path the rotating video heads (not shown) accurately scan the track pattern.

When the above described travel path adjustment is carried out, the tape tension becomes nonuniform in the transverse direction of the magnetic tape 23. This nonuniformity of tape tension can be eliminated by the following adjustment method.

In this adjustment, the lower part 111 of the pin 110 is inserted into a reference hole 101 (FIG. 9) formed in the loading arm 10. Then, by loosening the screws 94 and 95, the block 90 is released from its tightly fixed state relative to the loading arm 10. The block 90 is then turned in the arrow direction E. Its reference side surface 102 is pressed against the eccentric cylindrical part 112 of the pin 110. With the above mentioned parts in this state, the pin 110 is rotated.

The eccentric cylindrical of the pin 110 engages the reference side surface 102 of block 90 which moves gradually in either of the arrow directions F or E, relative to the pin 91. In accordance with this movement, the angle $\alpha$ of inclination of the guide pole 14 is varied in the vicinity of the pin 91.

By this adjustment, the tension distribution in the transverse direction of the magnetic tape 23 is corrected and becomes uniform in the region in wrapping contact with the cylindrical surface of the guide drum 19. The rotating heads (not shown) assume a state wherein they scan the magnetic tape in an inclined direction with uniform wrapping contact pressure.

With the adjusting mechanism in this state, the screws 94 and 95 are tightened thereby to fix the block 90 to the loading arm 10.

As a result, the magnetic recording/reproducing apparatus is interchangeably adjusted. The magnetic tape has a tape tension which is uniform across its width, as its is drawn from the cassette 18 and placed in wrapping contact across the cylindrical surface of the guide drum 19. The tape travels along the prescribed travel path over the cylindrical surface of the guide drum.

In the above described embodiment, an interchangeable adjustment of the apparatus is carried out by appropriately adjusting the adjusting mechanisms 60 and 62, which are provided for the first loading arm 10. However, the adjusting mechanisms 61 and 63 on the second loading arm 12 may also be adjusted in the same manner, with or without adjustment of the mechanisms 60 and 62. These adjustments appropriately vary the position of the tape guide 80a on the inlet side of the guide drum 19 and the inclination of the inclined tape guide pole 16.

The mechanism 61 for adjusting the loading arm rotational position and the mechanism 63 for adjusting guide pole inclination direction respectively have the same construction as the above described adjusting mechanisms 60 and 62. Their constituent parts are designated by the same reference numerals as the corresponding parts of the adjusting mechanisms 60 and 62. However, these reference numerals are differentiated by the addition of the subscript a. Accordingly, a description of the construction and adjustment operation of the mechanisms 61 and 62 is omitted.

Further, this invention is not limited to these embodiments but various variations and modifications may be made without departing from the scope and spirit of the invention.

What is claimed is:

1. In a recording and/or reproducing apparatus having a horizontal base plate, a guide drum including at least one head mounted to rotate in a plane within said drum, the cylindrical surface of said drum being inclined with respect to said base plate, recording tape disposed about a tape supply reel, the guide drum and a tape take-up reel in such a way that said tape defines a portion of a cylinder about said guide drum and the longitudinal center of said tape is disposed on substantially a single horizontal plane, and tape guide means for guiding the tape along a predetermined tape path, said tape guide means including a pair of height position guide means disposed respectively on the tape inlet side and on the tape outlet side of the cylindrical surface of said guide drum, a pair of guide poles disposed respectively between said height position guide means and said guide drum, each of said height position guide means having a pair of flanges for guiding the edges of said tape, each of said guide poles being inclined with respect to said base plate to convert between rectilinear and helical movements of said tape, the improvement in said tape guide means comprising:

first means for supporting one of said height position guide means;
first displacing means for causing the first support means and the supported height position guide means to be displaced horizontally and to change the distance between the guide drum and said one of the height position guide means, to thereby adjust the height position of the tape on the guide drum;
first locking means for locking the first support means after the adjustment of said first displacing means;
a second means for supporting one of said guide poles between the guide drum and said one of the height position guide means;
second displacing means for causing the second supporting means and the supported guide pole to be rotatably displaced horizontally and to change the inclination of the pole with respect to the axis of said guide drum, to thereby adjust the uniformity of tape tension across the width of the tape on and in the vicinity of the guide drum; and
second locking means for locking the second supporting means after the adjustment of said second displacing means.

2. The improvement as defined in claim 1 further comprising:
a third means for supporting the other of said height position guide means;
third displacing means for causing the third support means and the supported height position guide means to be displaced horizontally and to change the distance between the guide drum and the other of the height position guide means, to thereby adjust the height position of the tape on the guide drum;
third locking means for locking the third supporting means after the adjustment of the third displacing means;
a fourth means for supporting the other of said guide poles;
fourth displacing means for causing the fourth supporting means and the supported guide pole to be rotatably displaced horizontally and to change the inclination of the other guide pole with respect to the axis of said guide drum, to thereby adjust the uniformity of the tape tension across the width of the tape on and in the vicinity of the guide drum; and
fourth locking means for locking the fourth support means after the adjustment of said fourth displacing means.

3. The improvement as defined in claim 2 further comprising: moving means for rotatably moving said second and fourth supporting means respectively to a position where said inclined guide poles engage the tape at a specific tape guide position, and load the tape engaged by said guide poles into said predetermined tape path around the cylindrical surface of said guide drum; and means at said first and third supporting means respectively for intercepting the movement of said moving means at said specific tape guide position.

4. The improvement as defined in claim 1 wherein said first supporting member comprises a sliding plate, and said first displacing means comprises means for causing said sliding plate to be slidingly displaced.

5. The improvement as defined in claim 4 further comprising supporting structure means for slidably supporting said sliding plate, said means causing a sliding displacement comprising a jig fitted in a reference hole formed in said supporting structure means at a position in the vicinity of said sliding plate and for making contact with the side of said sliding plate to adjust the sliding position of the sliding plate.

6. The improvement as defined in claim 1 wherein: said second supporting member comprises a rotating plate for supporting said one of the inclined guide poles; and said second displacing means comprises a support shaft for rotatably supporting said rotating plate, and means for causing the rotating plate to be rotatably displaced around said support shaft.

7. The improvement as defined in claim 6 further comprising structure means including said support shaft for supporting said rotating plate, said rotatable displacing means comprising a jig fitted in a reference hole formed in said structure means at a position in the vicinity of said rotating plate, and said jig making contact with a side surface of the rotating plate to determine the rotatory position of the rotating plate.

* * * * *